(12) United States Patent
Finkler et al.

(10) Patent No.: US 8,006,214 B2
(45) Date of Patent: Aug. 23, 2011

(54) EXACT GEOMETRY OPERATIONS ON SHAPES USING FIXED-SIZE INTEGER COORDINATES

(75) Inventors: Ulrich Finkler, Mahopac, NY (US); Alexey Lvov, Congers, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 12/046,828

(22) Filed: Mar. 12, 2008

(65) Prior Publication Data

US 2009/0231343 A1    Sep. 17, 2009

(51) Int. Cl.
*G06F 17/50* (2006.01)

(52) U.S. Cl. ......... 716/124; 716/55; 716/118; 716/119; 716/122; 716/125; 716/135

(58) Field of Classification Search ................... 716/55, 716/118–119, 122, 124–145
See application file for complete search history.

(56) References Cited

U.S. PATENT DOCUMENTS

| | | | |
|---|---|---|---|
| 4,523,851 A | | 6/1985 | Maheras et al. |
| 4,542,397 A | | 9/1985 | Biegelsen et al. |
| 5,822,214 A | * | 10/1998 | Rostoker et al. ............. 716/123 |
| 6,009,251 A | | 12/1999 | Ho et al. |
| 6,178,539 B1 | * | 1/2001 | Papadopoulou et al. ..... 716/122 |
| 6,220,919 B1 | | 4/2001 | Cheng |
| 6,407,434 B1 | * | 6/2002 | Rostoker et al. ............. 257/401 |
| 6,757,876 B2 | | 6/2004 | Habitz |
| 2005/0172251 A1 | | 8/2005 | Chang et al. |

FOREIGN PATENT DOCUMENTS

| | | |
|---|---|---|
| GB | 8790191 | 2/1980 |
| JP | 361061419 A | 3/1986 |

OTHER PUBLICATIONS

H. Bronnimann et al., "Computing Exact Geometric Predicates Using Modular Arithmetic with Single Precision," 13th Annual ACM Symposium on Computational Geometry, Nice France (Jun. 4-6, 1997).

C. Burnikel, et al., "Efficient Exact Geometric Computation Made Easy," Proceedings of the fifteenth annual symposium on Computational Geometry SCG (Jun. 1999).

(Continued)

*Primary Examiner* — Stacy A Whitmore
(74) *Attorney, Agent, or Firm* — Preston Young; Michael J. Chang, LLC (57) ABSTRACT

Techniques for improving efficiency and accuracy of computer-aided design are provided. In one aspect, a method for generating a computer-based representation of a design having one or more shapes is provided comprising the following steps. Each of the shapes in the design is represented with one or more trapezoids, wherein a fixed number of non-vertical lines are used to define an x-coordinate of a left and right base and sides of each trapezoid with intersection points being formed between the non-vertical lines that define the sides. The x-coordinates and intersection points are used to divide the trapezoids into disjoint trapezoids, wherein each disjoint trapezoid is defined by a combination of the same non-vertical lines that are used to define one or more of the trapezoids. An order is assigned to the x-coordinates and intersection points, wherein the x-coordinates and intersection points in the assigned order are representative of the design.

20 Claims, 9 Drawing Sheets

OTHER PUBLICATIONS

C. Burnikel, et al., "Exact Geometric Computation in LEDA," Proceedings of the eleventh annual symposium on Computational Geometry SCG '95 (Sep. 1995).

Gupta, et al., "Toward a Systematic-Variation Aware Timing Methodology," Proceedings of the 41st Annual Conference on Design Automation DAC (Jun. 2004).

S. Schirra, "Robustness and Precision Issues in Geometric Computation," Handbook of Computational Geometry, Chapter 14, pp. 597-632, Elsevier Science Publishers, Amsterdam (2000).

K. Sugihara, "Resolvable Representation of Polyhedra," Proceedings on the Second ACM Symposium on Solid Modeling and Applications, p. 127-135, Montreal, Quebec, Canada (May 19-21, 1993).

C.K. Yap, et al., "The Exact Computation Paradigm," Computing in Euclidean Geometry, vol. 4 of Lecture Notes Series on Computing, pp. 452-492, World Scientific, 2nd Edition (1995).

R. Banerjee, et al., "Topologically Exact Evaluation of Polyhedra Defined in CSG With Loose Primitives," Computer Graphics Forum, vol. 15, No. 4, pp. 205-217 (1996).

Dobkin et al., "An Efficient Algorithm for Finding the CSG Representation of a Simple Polygon," digital, Systems Research Center (Sep. 1989).

H. Halliwell, "Consistent Shape Check in LSI Masks," TDB 02-80, p. 4232-4234 (Feb. 1980).

K. Mehlhorn, et al., A platform for combinatorial and geometric computing, Cambridge university press, 1999.

http//gmplib.org/.

http//www.cgal.org/.

C. Hoffmann, Geometric and Solid Modeling, Morgan-Kaufmann, San Mateo, CA, 1989.

C.M. Hoffmann, "The problems of accuracy and robustness in geometric computation," IEEE Computer 22(3):31-41, Mar. 1989.

C. Yap, "Towards exact geometric computation," Comput. Geom. Theory Appl., 7(1):3-23, 1997.

Kokichi Sugihara, an intersection algorithm based on Delaunay Triangulation, IEEE Computer Graphics and Applications, v. 12, n. 2, p. 59-67, Mar. 1992.

M. Lavin et al., "CAD Computations for Manufacturability: can we save VLSI Technology from itself?" Proceedings of the 2002 IEEE/ACM International Conference on Computer-Aided design ICCAD '02 (Nov. 2002).

* cited by examiner

EXACT GEOMETRY OPERATIONS ON SHAPES USING FIXED-SIZE INTEGER COORDINATES

FIELD OF THE INVENTION

The present invention relates to computer-aided design (CAD), and more particularly, to techniques for improving efficiency and accuracy of CAD in applications such as very-large-scale integration (VLSI).

BACKGROUND OF THE INVENTION

Computer-aided design (CAD) is commonly used by chip designers to plan circuit layouts. Through the use of CAD-generated circuit diagrams, chip designers can easily mock-up multiple circuit layouts, anticipate potential problems in a particular layout and determine space-saving configurations.

To be a useful tool in chip design, however, the CAD-generated circuit must be as precise as possible. Specifically, circuit layouts typically involve multiple shapes, many of which intersect with and/or overlap one another. The interaction of the shapes is very important. Any misrepresentation of an intersection or overlap of one shape with another can result in an erroneous point of connectivity in the design, thus producing a faulty circuit.

Several different CAD circuit design systems currently exist. Some of these systems employ a "smart-rounding" technique based on an integer grid. With smart-rounding, whenever a non-integer coordinate is encountered in a design rounding is performed to the next-closest integer coordinate (so as to preserve the connectivity). Smart-rounding, however, requires a lot of extra runtime and extra work on the part of the system operator. Further, whenever rounding is involved, there is no guarantee that connectivity can be preserved in all cases. Others use infinite precision rational coordinates, thus avoiding errors associated with rounding. The use of infinite precision rational coordinates, however, makes memory usage grow very rapidly and results in a runtime that is unacceptably slow.

With very-large-scale integration (VLSI), wherein potentially thousands of circuits are integrated on a single chip, the complexity of the design increases exponentially, as does the margin for error. Further, many VLSI applications, in particular lithography and process simulations, introduce designs that include arbitrary angles. Some conventional CAD systems can accommodate angles in a design, as long as the angles are multiples of 45 degrees. Thus, most arbitrary angles would not qualify. As such, complex VLSI designs are beyond the capabilities of conventional CAD tools.

Therefore, a more accurate and efficient design system that can accommodate complex circuits, such as VLSI, would be desirable.

SUMMARY OF THE INVENTION

The present invention provides techniques for improving efficiency and accuracy of computer-aided design (CAD) in applications such as very-large-scale integration (VLSI). In one aspect of the invention, a method for generating a computer-based representation of a design having one or more shapes is provided. The method comprises the following steps. Each of the shapes in the design is represented with one or more trapezoids, wherein a fixed number of non-vertical lines are used to define an x-coordinate of a left base, an x-coordinate of a right base and sides of each trapezoid with intersection points being formed between the non-vertical lines that define the sides of the trapezoids. The x-coordinates of the bases and the intersection points of the non-vertical lines are used to divide one or more of the trapezoids into a plurality of disjoint trapezoids, wherein each disjoint trapezoid is defined by a combination of the same non-vertical lines that are used to define one or more of the trapezoids. An order is assigned to the x-coordinates of the bases and the intersection points of the non-vertical lines, wherein the x-coordinates of the bases and the intersection points of the non-vertical lines in the assigned order are representative of the design.

A more complete understanding of the present invention, as well as further features and advantages of the present invention, will be obtained by reference to the following detailed description and drawings.

DETAILED DESCRIPTION OF PREFERRED EMBODIMENTS

Figure 1:
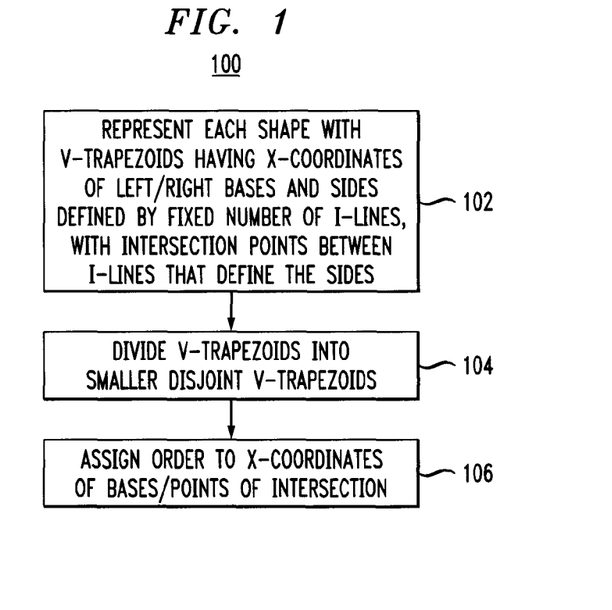
FIG. 1 is a diagram illustrating an exemplary methodology for generating a computer-based representation of a design according to an embodiment of the present invention.

FIG. 1 is a diagram illustrating exemplary methodology 100 for generating a computer-based representation of a design. In general, the design is made up of a shape, or a combination of shapes. By way of example only, the union of multiple shapes, such as polygons, can form a design. In one specific application of the present techniques, methodology 100 is used as a computer-aided design (CAD) tool for creating very-large-scale integration (VLSI) designs having arbitrary angle shapes, wherein one or more of the shapes represent integrated circuit components.

Advantageously, the present techniques permit any amount of sequential basic geometry operations, such as intersection, union, difference and deoverlap, to be performed with exact geometric precision (i.e., resulting in mathematically exact depictions of designs with no rounding errors) even when arbitrary angle shapes are part of the design. As highlighted above, this precision is important in circuit design to ensure proper electrical connectivity and undistorted boundaries. Therefore, by way of example only, the present techniques can be used to generate a VLSI design with exact geometric precision. The design can be stored and regenerated with the same exact geometric precision. By comparison, with conventional techniques rounding is often used for arbitrary angle shapes which can lead to errors in the design, such as electrical shorts and/or connectivity breakage. Several examples of exact geometry versus rounding are provided in FIGS. 6-8 (described below). Further, as will be described below, with the present techniques an amount of time and memory per one basic geometry operation are constant. As highlighted above, using infinite precision rational coordinates is not an acceptable solution for most practical applications, especially those involving VLSI.

In step 102, each shape in the design is represented with one or more vertical trapezoids (V-trapezoids). The term "V-trapezoid" refers to a trapezoid that is defined by a fixed number of non-vertical integer lines (I-lines). See, for example, FIG. 2 (described below). As will be described in detail below, the I-lines are used to define an x-coordinate of a left base, an x-coordinate of a right base and sides of each V-trapezoid. The I-lines that define the sides of the V-trapezoids will intersect with one another. These intersection points, along with the x-coordinates of the bases of the V-trapezoids will be used to divide the V-trapezoids into smaller disjoint V-trapezoids. See step 104 (described below). The V-trapezoids can have either integer or non-integer vertices.

Each shape in the design can be represented as a point set with vertices on an integer grid (i.e., the design is a combination of point sets). It is assumed that all of the point sets (shapes) of the design belong to a common universal bounding box:

[−CoordMax,CoordMax]×[−CoordMax,CoordMax].

By way of example only, the universal bounding box can be a [−one billion integer points, one billion integer points]×[−one billion integer points, one billion integer points] rectangle. The universal bounding box gives a bound on the integers used, e.g., 32-bit, 64-bit, etc. Most designs fit into a 64-bit bounding box, i.e., a rectangle having sides longer than $1 \times 10^{18}$. According to the present teachings, the design has integer point vertices.

In step 104, using the x-coordinates of the bases of the V-trapezoids and the intersection points of the I-lines, i.e., that define the sides of the V-trapezoids, the V-trapezoids are divided into smaller disjoint, i.e., non-intersecting, V-trapezoids. Namely, as will be described in detail below, vertical cuts will be made through the x-coordinates of the bases/intersection points to divide the V-trapezoids. Thus, the same I-lines that were used to define the V-trapezoids in step 102 (described above) are also used to define the disjoint V-trapezoids. Namely, a combination of those same I-lines from one or more of the V-trapezoids are used to define the disjoint V-trapezoids. Advantageously, as will be described in detail below, the same fixed number, e.g., a six-tuple, of I-lines is used to define all of the V-trapezoids described herein. Therefore, all of the I-lines needed for methodology 100 are already present in step 102 and, following step 102, no new I-lines are created. Like the V-trapezoids in step 102 (described above), each of the disjoint V-trapezoids will have a left base, a right base and sides. The disjoint V-trapezoids can have non-integer point vertices.

In step 106, an order is assigned to the x-coordinates of the bases and the points of intersection (step 102, described above), wherein the x-coordinates of the bases and points of intersection in the assigned order are representative of the design. Further, the vertical cuts through the x-coordinates of the bases/points of intersection can be used to form a number of vertical columns that partition the design (e.g., each disjoint V-trapezoid being present in exactly one of the columns). A tag can be assigned to each column to indicate, for example, to which V-trapezoid(s) (step 102, described above) each disjoint V-trapezoid in that column belongs.

Figure 2:
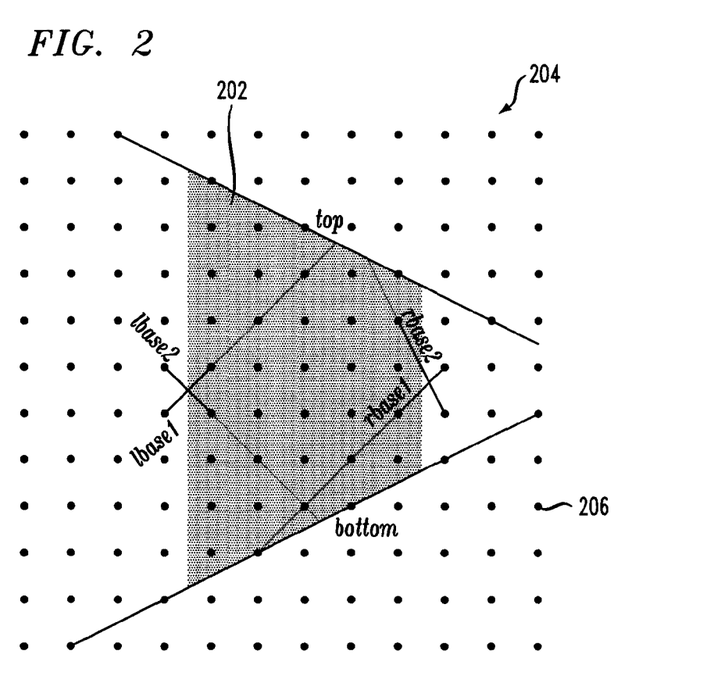
FIG. 2 is a diagram illustrating an exemplary vertical trapezoid (V-trapezoid) on an integer grid according to an embodiment of the present invention.

FIG. 2 is a diagram illustrating V-trapezoid 202 on integer grid 204. V-trapezoid 202 is representative of either the V-trapezoids described in conjunction with the description of step 102 of FIG. 1, above, or the disjoint V-trapezoids described in conjunction with the description of step 104 of FIG. 1, above. As highlighted above, an integer grid represents at least a portion of some universal bounding box. Therefore, each black dot 206 in integer grid 204 represents a different integer point within a given universal bounding box. Each integer point is identifiable in the universal bounding box by two integer coordinates from the segment [−CoordMax, CoordMax].

Any non-vertical line passing through two different integer points inside of the universal bounding box is an I-line. In general, a V-trapezoid (for example, V-trapezoid 202) is a trapezoid that has 1) an x-coordinate of its left base equal to an x-coordinate of a point of intersection of a pair of I-lines, for example, I-lines labeled "lbase1" and "lbase2," 2) an x-coordinate of its right base equal to an x-coordinate of a point of intersection of another pair of I-lines, for example, I-lines labeled "rbase1" and "rbase2" and 3) bottom and top sides that are segments of yet another pair of I-lines, for example, I-lines labeled "bottom" and "top," respectively. As highlighted above, the vertices of the V-trapezoids are not necessarily integer vertices.

According to the present teachings, any one of the V-trapezoids described herein is completely defined by a six-tuple of I-lines, e.g., {(lbase1,lbase2),(rbase1,rbase2),bottom,top}.

Since any non-vertical line passing through two different integer points is an I-line, and each integer point is identifiable in the universal bounding box by two integer coordinates, then each I-line can be defined by four integer coordinates. Therefore, 24 integer coordinates (based on a six-tuple of I-lines) from the segment [−CoordMax,CoordMax] (a range of numbers, for example, all numbers less than or equal to (≦) 100 but greater than or equal to (≧)−100) can be used to store a V-trapezoid. Thus, the amount of bits for storage of each integer coordinate is less than log(CoordMax*2). With the present techniques, a fixed number of I-lines and thus a fixed number of integer coordinates are used to represent any V-trapezoid.

Any shape from a design, such as a polygon, with integer point vertices can be represented as a V-trapezoid(s). See, for example, step 102 of FIG. 1 (described above). By way of example only, if vertical cuts are made through each vertex of the shape, wherein each cut starts from outside of the shape and passes through one of the vertices until the cut remains inside of the shape, then the shape is broken down into y-parallel trapezoids (i.e., trapezoids with bases parallel to a y-axis), with bottom and top sides of each y-parallel trapezoid being non-vertical segments of the boundary of the original polygon, and thus segments of I-lines. The steps carried out to break down an exemplary shape into y-parallel trapezoids is shown illustrated in FIGS. 9A-G (described below). The x-coordinates of bases of the y-parallel trapezoids are x-coordinates of the vertices of the shape. Each vertex of the shape is an integer point and as such can be represented as the intersection of I-lines going through that vertex at +45 degree (°) and −45° angles. Thus, the y-parallel trapezoids with integer vertices are V-trapezoids. As described above, no more than 24 integer coordinates are needed to store a V-trapezoid in memory.

To explain the present techniques, the following non-limiting example is provided wherein a design is represented by exactly two V-trapezoids, e.g., Basic(V-trapezoid A,V-trapezoid B).

Figure 3:
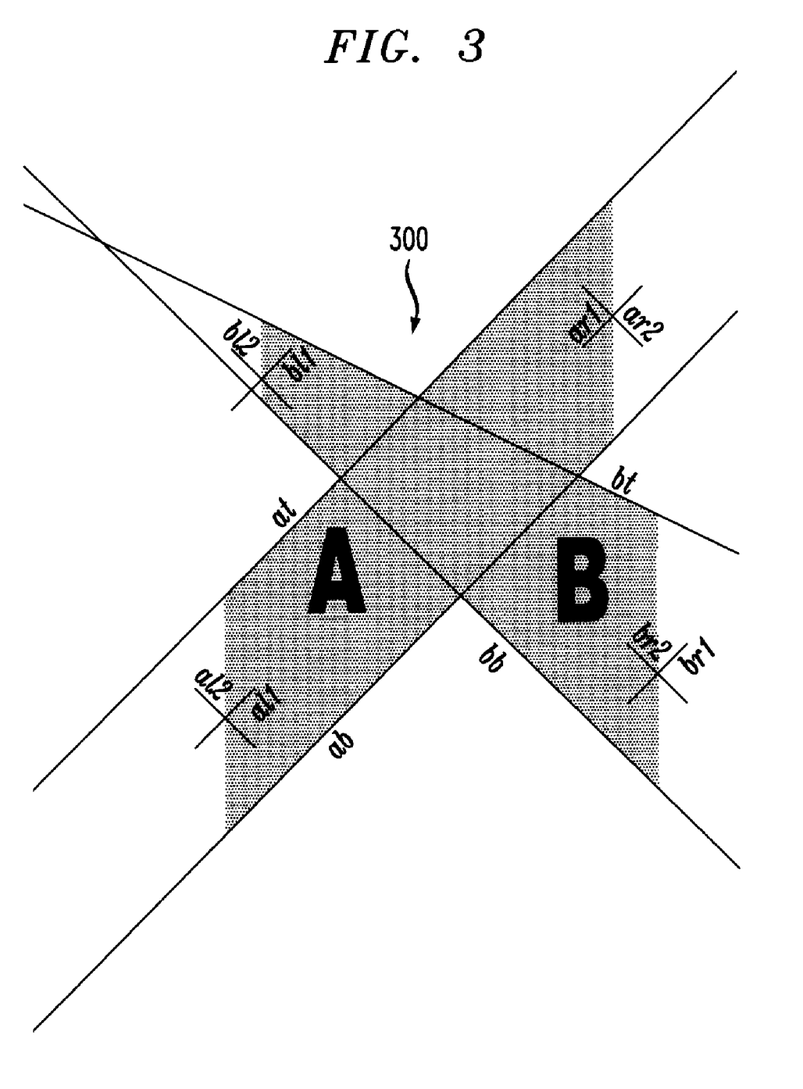
FIG. 3 is a diagram illustrating an exemplary design that is represented by two V-trapezoids according to an embodiment of the present invention.

See, for example, FIG. 3. FIG. 3 is a diagram illustrating exemplary design 300 that is represented by two V-trapezoids labeled "A" and "B." As shown in FIG. 3, each of V-trapezoids A and B is completely defined by a six-tuple of I-lines. FIG. 3 illustrates the result of performing step 102 of FIG. 1 (described above) for this particular example.

More specifically, V-trapezoid A and V-trapezoid B can be defined by a six-tuple of I-lines each, e.g., V-trapezoid $A=\{(a1,a2),(ar1,ar2),ab,at\}$, V-trapezoid $B=\{(bl1,bl2),(br1,br2),bb,bt\}$, wherein for V-trapezoid A an x-coordinate of a point of intersection of I-lines a1 and a2 defines an x-coordinate of a left base of V-trapezoid A, an x-coordinate of a point of intersection of a pair of I-lines ar1 and ar2 defines an x-coordinate of a right base of V-trapezoid A, a segment of I-line ab defines a bottom side of V-trapezoid A and a segment of I-line at defines a top side of V-trapezoid A; and wherein for V-trapezoid B an x-coordinate of a point of intersection of I-lines bl1 and bl2 defines a left base of V-trapezoid B, an x-coordinate of a point of intersection of I-lines br1 and br2 defines a right base of V-trapezoid B, a segment of I-line bb defines a bottom side of V-trapezoid B and a segment of I-line bt defines a top side of V-trapezoid B. As such, V-trapezoids A and B are represented by a total of 12 I-lines (six I-lines each). Therefore, as described above, V-trapezoids A and B can each be represented by the same number, i.e., a fixed number of integer coordinates. Namely, 24 integer coordinates (i.e., four integer coordinates per I-line) can be used to represent each of V-trapezoids A and B.

Figure 4:
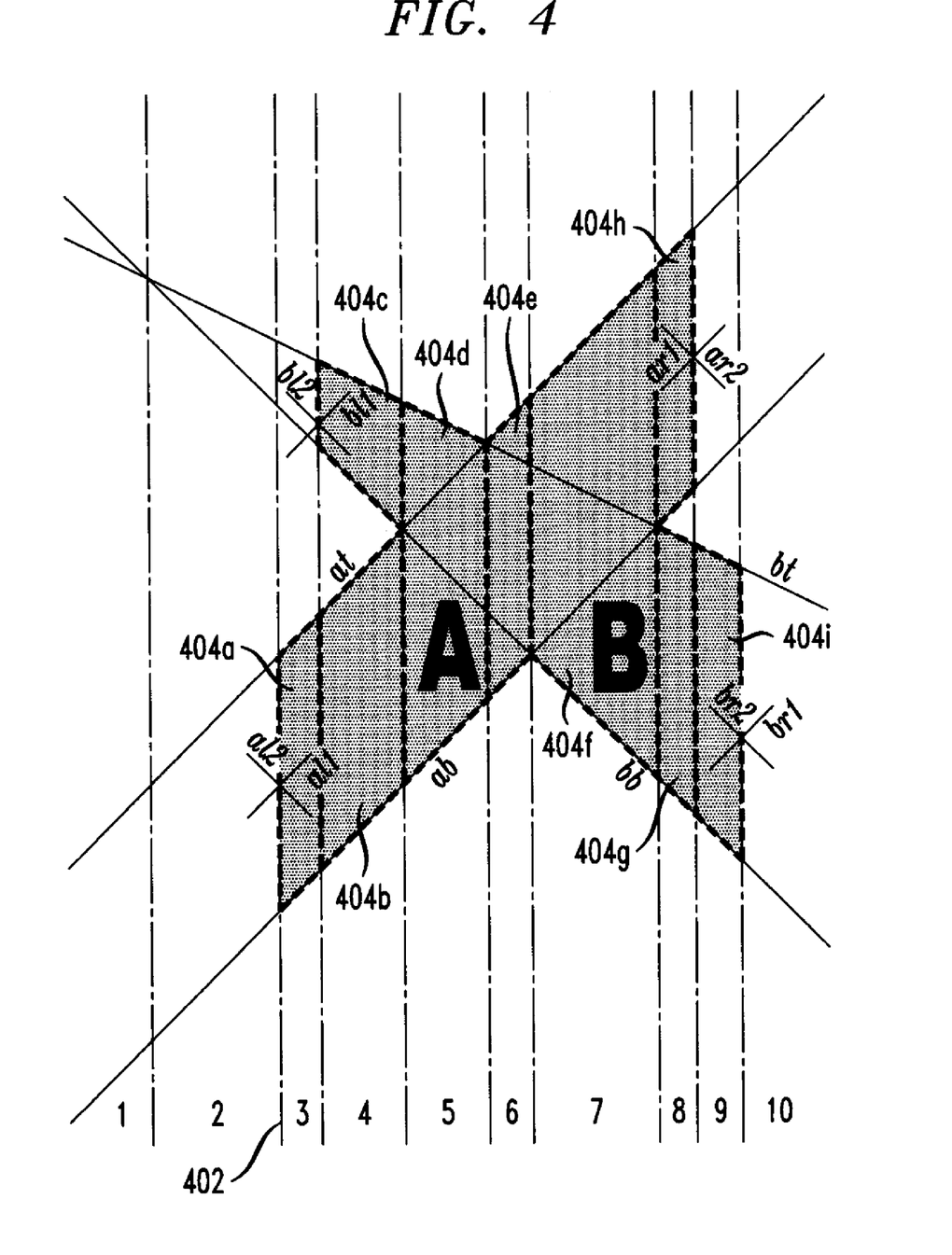
FIG. 4 is a diagram illustrating the V-trapezoids of FIG. 3 being divided into a plurality of smaller disjoint V-trapezoids according to an embodiment of the present invention.

V-trapezoids A and B are then divided into smaller disjoint V-trapezoids. See, for example, FIG. 4. FIG. 4 is a diagram illustrating V-trapezoids A and B being divided into a plurality of smaller disjoint V-trapezoids, i.e., disjoint V-trapezoids 404a-i. FIG. 4 illustrates the result of performing step 104 of FIG. 1 (described above) for this particular example. Further, FIG. 4 in combination with FIG. 5 (described below) illustrate the result of performing step 106 of FIG. 1 (described above) for this particular example. According to the present teachings, all of disjoint V-trapezoids 404a-i will be defined by some six-tuples of I-lines which are subsets of the above 12 I-lines (FIG. 3, described above). Namely, no new I-lines are ever created during the basic geometry operations. As such, each of disjoint V-trapezoids 404a-i is defined by a combination of the I-lines used to define V-trapezoids A and B (see FIG. 3). By way of example only, disjoint V-trapezoid 404d is defined by a combined six-tuple of I-lines from V-trapezoid A and V-trapezoid B, i.e., $\{(at,bb),(at,bt),ab,bt\}$, wherein (at, bb) defines the x-coordinate of the left base, (at, bt) defines the x-coordinate of the right base and ab and bt define the sides of disjoint V-trapezoid 404d.

According to the present techniques, all operations with numeric coordinates are wrapped into just two Boolean functions on I-lines. With the exception of these two functions the present techniques use only combinatorial operations.

The first Boolean function is "bool point A is not to the left of point B (I-line a1, I-line a2, I-line b1, I-line b2)," which returns "true" if and only if I-lines a1 (i.e., al1 and ar1) and a2 (i.e., al2 and ar2) intersect at some point A, I-lines b1 (i.e., bl1 and br1) and b2 (i.e., bl2 and br2) intersect at some point B and (x coordinate of A)≧(x coordinate of B). Or, in terms of the coordinates, the first Boolean function returns "true," if and only if:

$detA \neq 0$ and $detB \neq 0$ and $det_x A \cdot detB \geq det_x B \cdot detA$, where $detA=(a1_{y1}-a2_{y1})(a2_{x2}-a1_{x2})-(a1_{y2}-a2_{y2})(a2_{x1}-a1_{x1})$, $detB=(b1_{y1}-b2_{y1})(b2_{x2}-b1_{x2})-(b1_{y2}-b2_{y2})(b2_{x1}-b1_{x1})$, $det_x A=(a1_{y1}a2_{x1}-a1_{x1}a2_{y1})(a2_{x2}-a1_{x2})-(a1_{y2}a2_{x2}-a1_{x2}a2_{y2})(a2_{x1}-a1_{x1})$, $det_x B=(b1_{y1}b2_{x1}-b1_{x1}b2_{y1})(b2_{x2}-b1_{x2})-(b1_{y2}b2_{x2}-b1_{x2}b2_{y2})(b2_{x1}-b1_{x1})$.

The first Boolean function requires only addition and multiplication of integer numbers. |detA| and |detB| are bounded by $8(CoordMax)^2$, $|det_x A|$ and $|det_x B|$ are bounded by $8(CoordMax)^3$ and the maximum absolute value of the integers involved is $\leq 64(CoordMax)^5$. Thus, the function uses only a constant amount of time and memory.

The second Boolean function is "bool line a is not below line b at minus infinity(I-line a, I-line b)," which returns "true" if and only if $f_a(x) \geq f_b(x)$ everywhere on some interval $(-\infty, t)$, where $t \in IR$ and $f_a(x)$, $f_b(x)$ are the functions which are defined by saying that their graphs are I-lines a, b, respectively. It is notable that this second Boolean function defines a correct linear order relation on I-lines. In particular, either "line a is not below line b at minus infinity(a, b)" or "line a is not below line b at minus infinity(b, a)" and, if both are true, then I-lines a and b coincide.

In terms of the coordinates, it is assumed that $a_{x2} \geq a_{x1}$. The function returns "true," if and only if:

$(det>0)$ or $(det=0$ and $(a_{y2}-a_{y1})b_{x1}+a_{y1}a_{x2}-a_{y2}a_{x1} \geq b_{y1}(a_{x2}-a_{x1}))$, where $det=(a_{x2}-a_{x1})(b_{y2}-b_{y1})-(a_{y2}-a_{y1})(b_{x2}-b_{x1})$.

The function requires only addition and multiplication of integer numbers. The maximum absolute value of the integers involved is $\leq 8(CoordMax)^2$. The function uses only a constant amount of time and memory.

Consider the following $\leq 10$ points, four of which define the x-coordinates of the bases of V-trapezoids A and B, see, for example, FIG. 3 (described above):

(al1,al2),(ar1,ar2),(bl1,bl2),(br1,br2),     (1)

and $\leq$six of which define pairwise intersections of the sides of V-trapezoids A and B:

(at,ab),(at,bb),(at,bt),(ab,bb),(ab,bt),(bb,bt).     (2)

For any two sides which are parallel or coincide, the point is skipped. See, for example, FIG. 3 (described above), wherein sides at and ab are parallel. Thus, in that instance, point (at, ab) can be skipped.

By using function "point A is not to the left of point B( . . . )" the above points are ordered left to right. The ordering of the x-coordinates of the bases and points of intersection was described in conjunction with the description of step 106 of FIG. 1, above. Vertical lines drawn through the points partition the plane into ≦11 vertical, sequentially numbered columns. See, for example, FIG. 4 wherein the columns are numbered "1" through "10." In the interior of each column, the I-lines ab, at, bb and bt either do not intersect or coincide. Therefore, it is possible to order the I-lines vertically. All of the columns except for Column 1, Column 2 and Column 10 are split by ab, at, bb and bt into ≦27 disjoint V-trapezoids, i.e., disjoint V-trapezoids 404a-i (and several unbounded pieces). Therefore, each of disjoint V-trapezoids 404a-i is contained in exactly one of the columns. Further, as shown in FIG. 4, any given column can contain more than one disjoint V-trapezoid. The x-coordinates of the bases of these disjoint V-trapezoids are defined by pairs of I-lines from sets (1) and (2) and the sides of these disjoint V-trapezoids are segments of ab, at, bb or bt.

Figure 5:
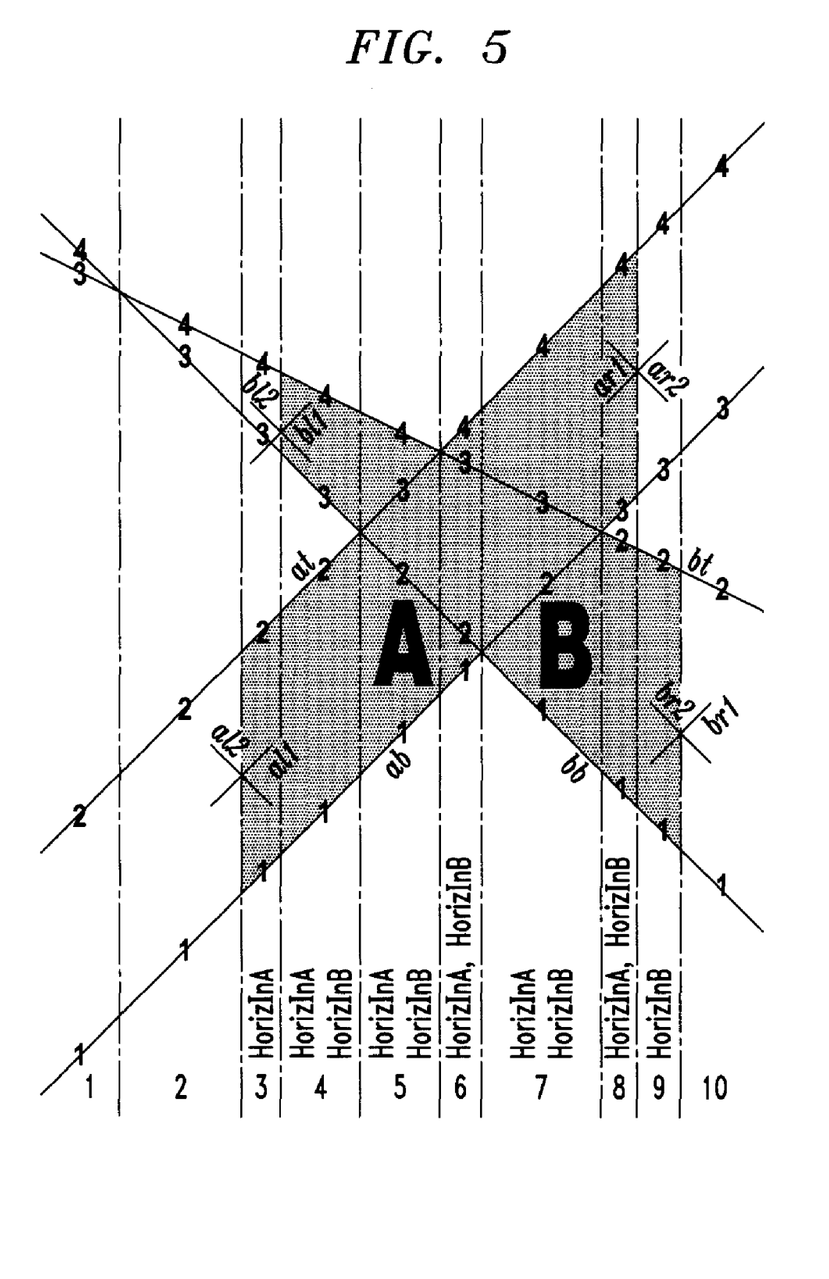
FIG. 5 is a diagram illustrating an ordering of non-vertical integer lines (I-lines) according to an embodiment of the present invention.

Next, using function "line a is not below line b at minus infinity( . . . )," I-lines ab, at, bb and bt are ordered in Column 1 bottom to top. This ordered set of four I-lines is called $S_1$. The same ordering is performed systematically through each column from left to right, i.e., through column 2 then through column 3, etc. See, for example, FIG. 5. FIG. 5 is a diagram illustrating an ordering of I-lines. Every time a point from set (2) is passed, the corresponding transposition of two elements of $S_i$ is made to form $S_{i+1}$ in the i+1-th column (some extra care is needed for degenerate cases wherein two or more points define the same vertical cut). A degenerate case is when three or more segments intersect at one point. In such a case, a small amount "epsilon" is added to the coordinates which makes the computation the same way as if there were no degeneracy, then set "epsilon" equal to zero.

According to the present techniques, a determination is also made as to whether a given disjoint V-trapezoid is between the bases of A (call this statement "Horizontally in A" or "HorizInA," i.e., that is between the left and right bases of V-trapezoid A) and/or is between the bases of B (call this statement "Horizontally in B" or "HorizInB," i.e., that is between the left and right bases of V-trapezoid B). Thus, for example, for the leftmost column (labeled column "1") $HorizInA_x$=$HorizInB_x$=false, meaning that the V-trapezoids, if any, that appear in column 1 do not belong to either V-trapezoid A or V-trapezoid B. These flags (i.e., "true" or "false") controllably change every time a point from the set (1) is passed. For example, $HorizInA_x$=true, $HorizInB_x$=false means that a given V-trapezoid belongs to V-trapezoid A, but not V-trapezoid B.

Tags (not shown) can then be assigned to each of the disjoint V-trapezoids. In the instant example, one of three tags may be used: tag "A" if a disjoint V-trapezoid belongs to V-trapezoid A only, tag "B" if a disjoint V-trapezoid belongs to V-trapezoid B only and tag "AB" if a disjoint V-trapezoid belongs to both V-trapezoid A and V-trapezoid B. See, for example, FIG. 3 (described above).

For example, with reference to FIG. 4 (described above), disjoint V-trapezoids 404a, 404b and 404h would each receive the tag "A," disjoint V-trapezoids 404c, 404g and 404i would each receive the tag "B" and disjoint V-trapezoids 404d, 404e and 404f would each receive the tag "AB." In this manner, the methodology finds A∪B, A∩B, A\B and B\A simultaneously. It can be checked by looking at all possible configurations of V-trapezoids A and B that the number of the disjoint V-trapezoids cannot exceed 15.

As described above, the present techniques provide mathematically exact point sets with no rounding errors. This is a notable advantage over conventional CAD techniques which permit rounding errors. Namely, rounding errors create a whole spectrum of problems for operations on VLSI designs. The accumulation of errors is the most harmless of rounding errors and can be overcome by using floating point numbers with high enough precision. The following three problems, i.e., breakage of electrical connectivity of the design, boundary distortion and breakage of main equalities, however, are much more severe and make it practically impossible to create an effective rounding-based CAD tool for VLSI circuits with arbitrary angle shapes.

Figure 6:
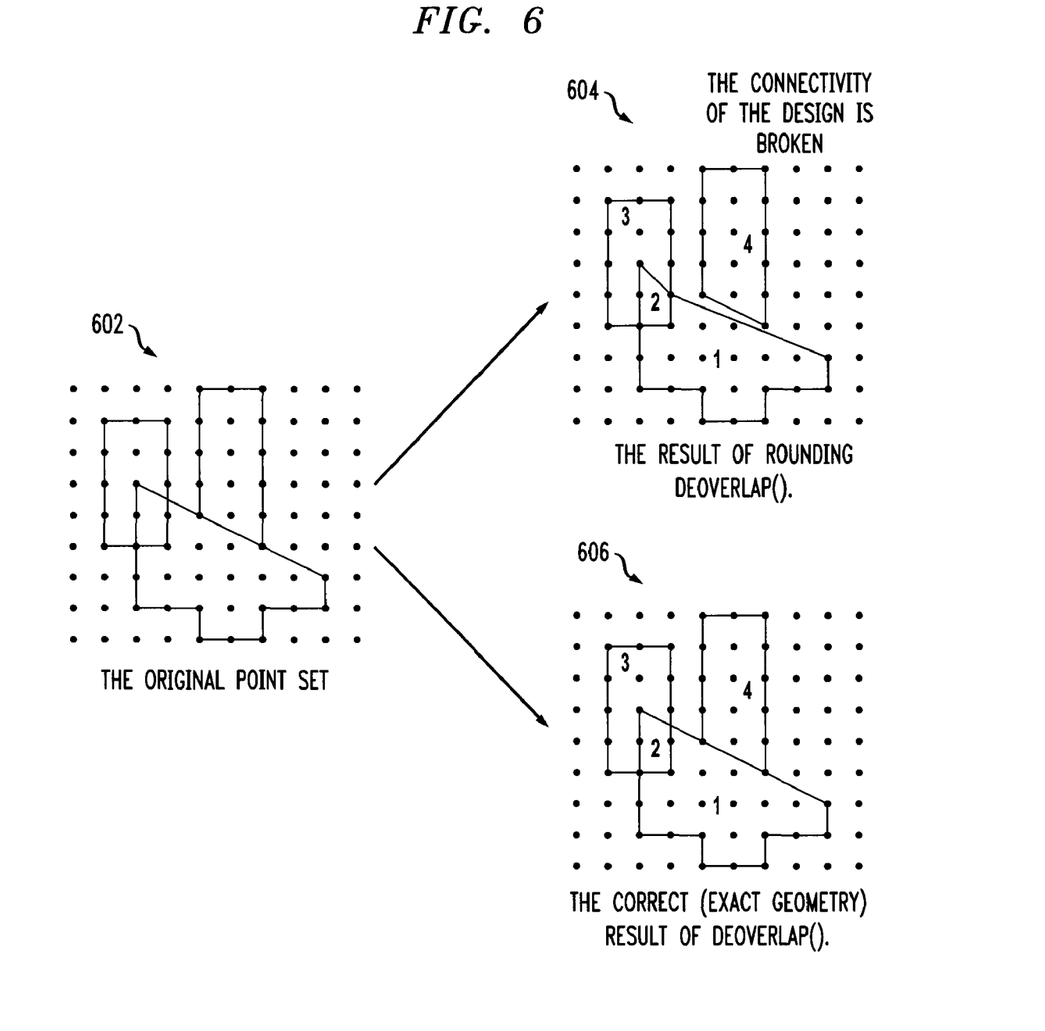
FIG. 6 is a diagram illustrating a comparison of exact geometry versus rounding according to an embodiment of the present invention.

With regard to breakage of the electrical connectivity of the design, electrical connectivity is one of the most important characteristics of the design. Rounding errors can easily create electrical shorts, as well as connectivity breakage. See, for example, FIG. 6. FIG. 6 is a diagram illustrating a comparison of the exact geometry of the present techniques versus conventional rounding. Namely, in FIG. 6, a design as shown on integer grid 602 is generated using both rounding (as shown on integer grid 604) and the present exact geometry (as shown on integer grid 606). Electrical connectivity is broken with the rounding approach.

Figure 7:
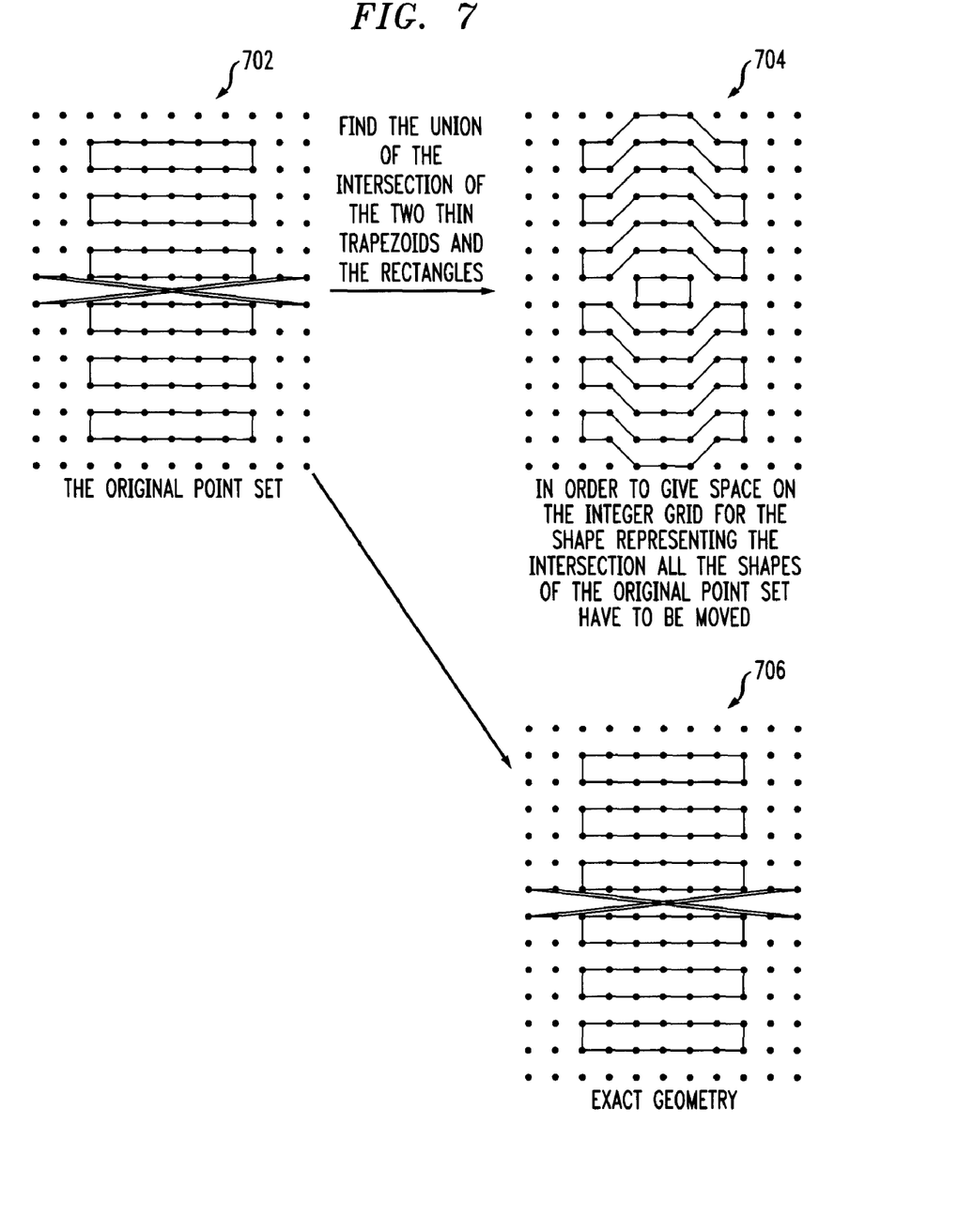
FIG. 7 is a diagram illustrating another comparison of exact geometry versus rounding according to an embodiment of the present invention.

Another, more severe, electrical connectivity problem is shown in FIG. 7. FIG. 7 is a diagram illustrating another comparison of the present techniques versus conventional rounding. Namely, in FIG. 7, a design as shown on integer grid 702 is generated using both conventional rounding (as shown on integer grid 704) and the present exact geometry (as shown on integer grid 706). With rounding, an electrical short is guaranteed unless adjustments are made to all shapes of the design.

All the types of connectivity distortion due to rounding do not admit any reasonable classification. If different types of connectivity distortion occur in combination, they cannot be corrected simultaneously unless an amount of time proportional to the size of the whole point set is spent per each short or breakage.

Figure 8:
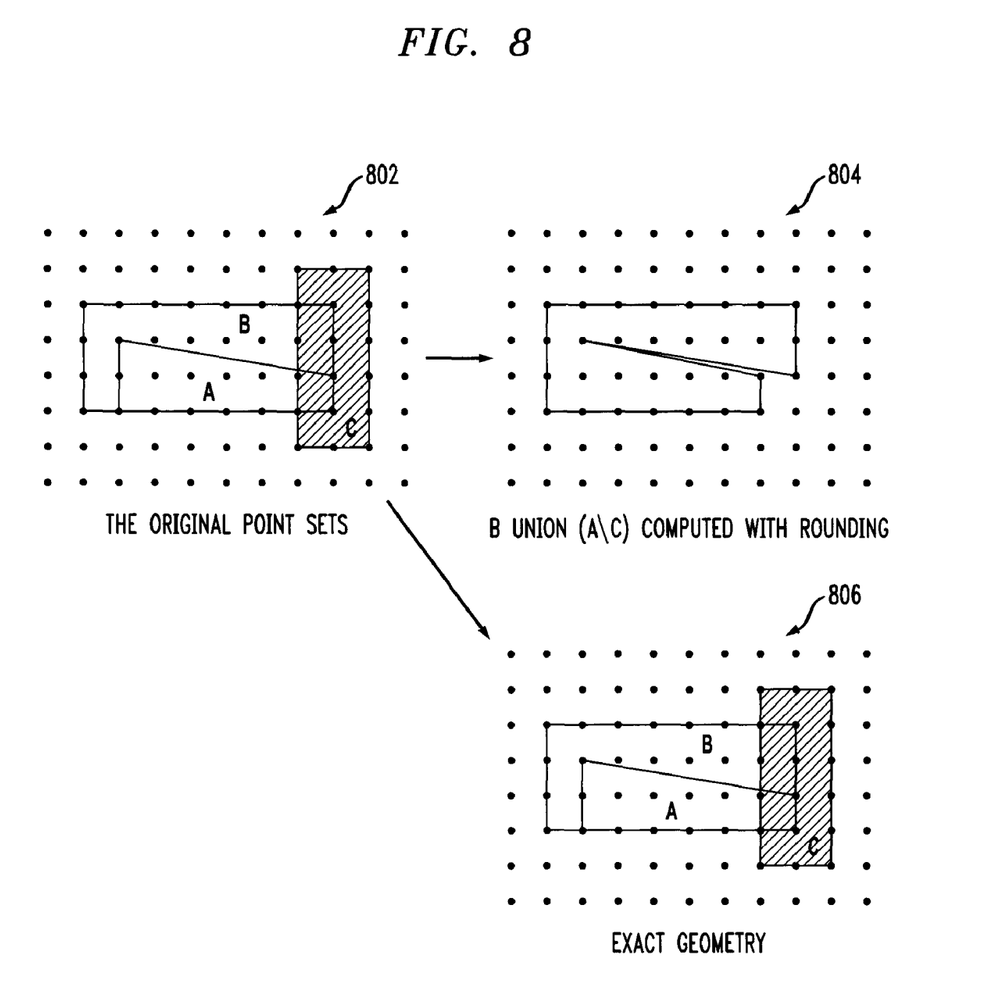
FIG. 8 is a diagram illustrating yet another comparison of exact geometry versus rounding according to an embodiment of the present invention.

With regard to boundary distortion, rounding errors can readily misconstrue boundaries within the design. See, for example, FIG. 8. FIG. 8 is a diagram illustrating yet another comparison of the present techniques versus conventional rounding. Namely, in FIG. 8, a design as shown on integer grid 802 is generated using both conventional rounding (as shown on integer grid 804) and the present exact geometry (as shown on integer grid 806). The correct length of the boundary of the set B∪(A\C) is 20.1805 . . . . However, the computation with rounding to the integer grid would yield 30.1818 . . . .

With regard to breakage of the main equalities, just as "a+b−a=b" does not hold for floating point numbers, basic statements such as $$A=(A\backslash B)\cup(A\cap B);$$

$$(A\backslash B) \text{ and } B \text{ are disjoint};$$

$$A\cap B \subset A; \text{ etc.}$$

do not hold for point sets in the presence of rounding errors. For example, testing if two point sets A and B are equal is trivial if the computations are exact:

$$A=B \text{ if and only if } A\backslash B=\emptyset \text{ and } B\backslash A=\emptyset.$$

However, it becomes a very "unpleasant" operation if rounding errors can occur. Namely, some threshold $\epsilon$ for the area has to be set, and then checked to see if area(A\B)<$\epsilon$ and area(B\A)<$\epsilon$, where A\B and B\A are unions of possibly overlapping polygons.

Figure 9A:
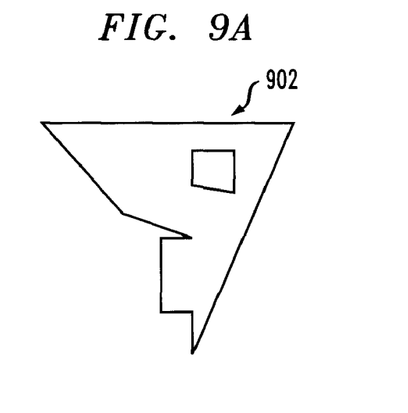
FIGS. 9A-G are diagrams illustrating an exemplary methodology for representing a shape as V-trapezoids according to an embodiment of the present invention.
Figure 9B:
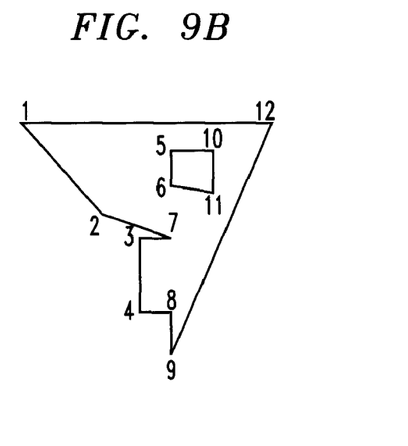

FIGS. 9A-G are diagrams illustrating an exemplary methodology for representing a shape as a plurality of V-trapezoids. As described above, this process involves breaking the shape down into y-parallel trapezoids. As shown in FIG. 9A, shape 902 is provided. Shape 902 is a polygon with integer and/or non-integer point vertices. As shown in FIG. 9B, the vertices of shape 902 are ordered from left to right and top to bottom. For example, shape 902 has 12 vertices. Working from left to right, vertex 1 is first encountered followed by vertex 2. The next two vertices are then ordered from top to bottom as vertex 3 and vertex 4, respectively. The remaining vertices are ordered in the same manner.

Figure 9C:
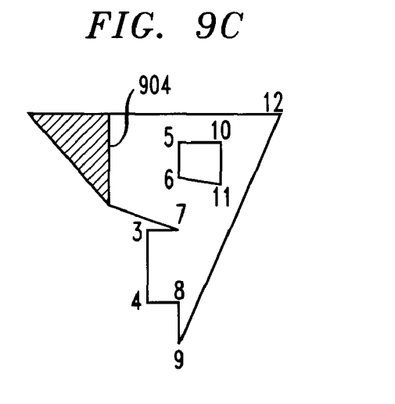

As shown in FIGS. 9C-G, vertical cuts are made through the vertices in the order assigned in FIG. 9B (described above). Namely, a top-down cut is made through each vertex, until the cut remains inside of the shape. For example, when a top-down cut is made through vertex 1 it does not pass into the shape, and therefore is not shown. As shown in FIG. 9C, a top-down cut 904 is made through vertex 2. A top-down cut through vertices 3 and 4 coincide with an outline of the shape.

Figure 9D:
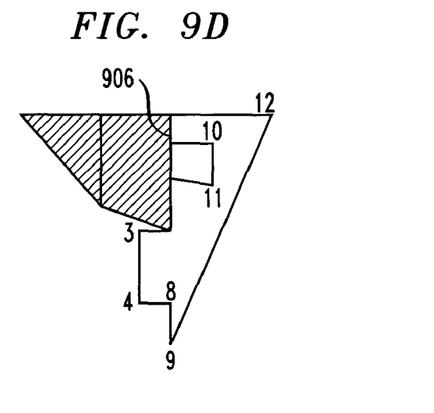
Figure 9E:
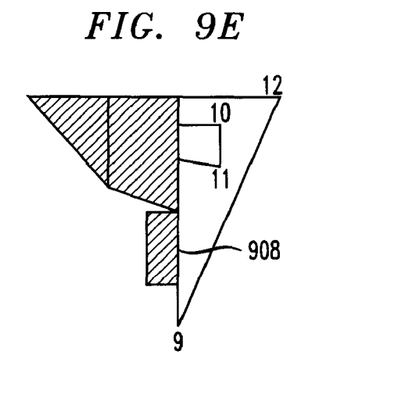
Figure 9F:
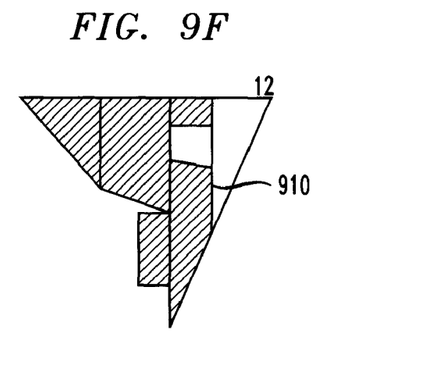
Figure 9G:
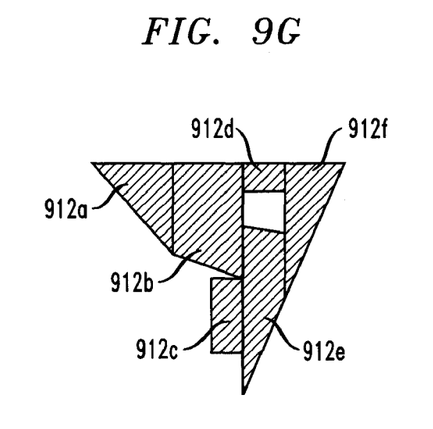

As shown in FIG. 9D, a top-down cut 906 is made through vertices 5, 6 and 7. As shown in FIG. 9E, a top-down cut 908 is made through vertex 8. A top-down cut through vertex 9 coincides with an outline of the shape. As shown in FIG. 9F, a top-down cut 910 is made through vertices 10 and 11. As with vertex 1, a top-down cut through vertex 12 does not pass into the shape, and therefore is not shown. As shown in FIG. 9G, shape 902 is now broken down into six y-parallel trapezoids, i.e., y-parallel trapezoids 912*a-f*.

Figure 10:
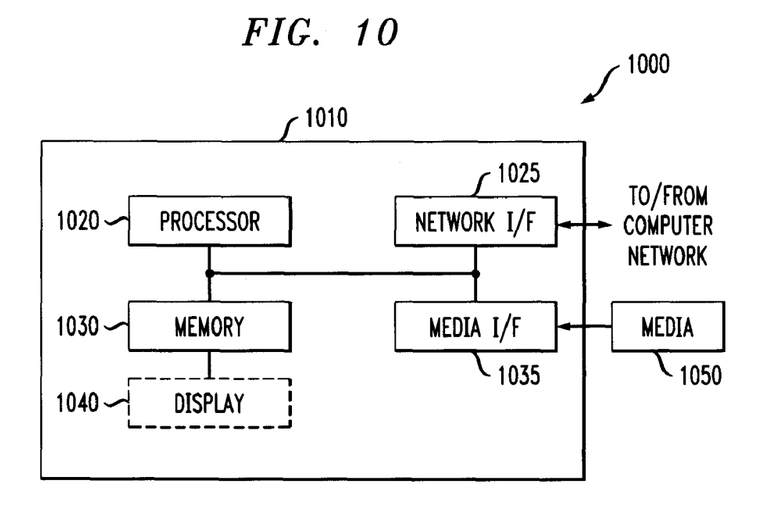
FIG. 10 is a diagram illustrating an exemplary system for generating a computer-based representation of a design according to an embodiment of the present invention.

Turning now to FIG. 10, a block diagram is shown of an apparatus 1000 for generating a computer-based representation of a design having one or more shapes, in accordance with one embodiment of the present invention. It should be understood that apparatus 1000 represents one embodiment for implementing methodology 100 of FIG. 1.

Apparatus 1000 comprises a computer system 1010 and removable media 1050. Computer system 1010 comprises a processor 1020, a network interface 1025, a memory 1030, a media interface 1035 and an optional display 1040. Network interface 1025 allows computer system 1010 to connect to a network, while media interface 1035 allows computer system 1010 to interact with media, such as a hard drive or removable media 1050.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to represent each of the shapes in the design with one or more trapezoids, wherein a fixed number of non-vertical lines are used to define an x-coordinate of a left base, an x-coordinate of a right base and sides of each trapezoid with intersection points being formed between the non-vertical lines that define the sides of the trapezoids; use the x-coordinates of the bases and the intersection points of the non-vertical lines to divide one or more of the trapezoids into a plurality of disjoint trapezoids, wherein each disjoint trapezoid is defined by a combination of the same non-vertical lines that are used to define one or more of the trapezoids; and assign an order to the x-coordinates of the bases and the intersection points of the non-vertical lines, wherein the x-coordinates of the bases and the intersection points of the non-vertical lines in the assigned order are representative of the design.

The machine-readable medium may be a recordable medium (e.g., floppy disks, hard drive, optical disks such as removable media 1050, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor 1020 can be configured to implement the methods, steps, and functions disclosed herein. The memory 1030 could be distributed or local and the processor 1020 could be distributed or singular. The memory 1030 could be implemented as an electrical, magnetic or optical memory, or any combination of these or other types of storage devices. Moreover, the term "memory" should be construed broadly enough to encompass any information able to be read from, or written to, an address in the addressable space accessed by processor 1020. With this definition, information on a network, accessible through network interface 1025, is still within memory 1030 because the processor 1020 can retrieve the information from the network. It should be noted that each distributed processor that makes up processor 1020 generally contains its own addressable memory space. It should also be noted that some or all of computer system 1010 can be incorporated into an application-specific or general-use integrated circuit.

Optional video display 1040 is any type of video display suitable for interacting with a human user of apparatus 1000. Generally, video display 1040 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for generating a computer-based representation of a design having one or more shapes, the method comprising the steps of:
   representing each of the shapes in the design with one or more trapezoids, wherein a fixed number of non-vertical lines are used to define an x-coordinate of a left base, an x-coordinate of a right base and sides of each trapezoid with intersection points being formed between the non-vertical lines that define the sides of the trapezoids;
   using the x-coordinates of the bases and the intersection points of the non-vertical lines to divide one or more of the trapezoids into a plurality of disjoint trapezoids, wherein each disjoint trapezoid is defined by a combination of the same non-vertical lines that are used to define one or more of the trapezoids; and
   assigning an order to the x-coordinates of the bases and the intersection points of the non-vertical lines, wherein the x-coordinates of the bases and the intersection points of the non-vertical lines in the assigned order are representative of the design, wherein one or more of the steps are performed using a processor.

2. The method of claim 1, wherein the representing step further comprises the step of:
   representing each of the shapes in the design with one or more trapezoids, wherein a six-tuple of non-vertical lines are used to define the x-coordinate of the left base, the x-coordinate of the right base and the sides of each trapezoid with intersection points being formed between the non-vertical lines that define the sides of the trapezoids.

3. The method of claim 2, wherein the using step further comprises the step of:
   using the x-coordinates of the bases and the intersection points of the non-vertical lines to divide one or more of the trapezoids into a plurality of disjoint trapezoids, wherein each disjoint trapezoid is defined by a combination of the same six-tuple of non-vertical lines that are used to define one or more of the trapezoids.

4. The method of claim 1, wherein the representing step further comprises the step of:
representing each of the shapes in the design with one or more trapezoids, wherein for each trapezoid the x-coordinate of the left base is equal to an x-coordinate of a point of intersection of a first pair of the non-vertical lines, the x-coordinate of the right base is equal to an x-coordinate of a point of intersection of a second pair of the non-vertical lines and the sides comprise segments of a third pair of the non-vertical lines.

5. The method of claim 1, wherein the design belongs to a universal bounding box [−CoordMax, CoordMax]×[−CoordMax, CoordMax] having a plurality of integer points, and wherein the representing step further comprises the step of:
representing each of the shapes in the design with one or more trapezoids, wherein a fixed number of the non-vertical lines are used to define the x-coordinate of the left base, the x-coordinate of the right base and the sides of each trapezoid, and wherein each of the non-vertical lines passes through at least two of the integer points.

6. The method of claim 1, wherein the design belongs to a universal bounding box [−CoordMax, CoordMax]×[−CoordMax, CoordMax] having a plurality of integer points, each integer point being identifiable in the universal bounding box by two integer coordinates, and wherein the representing step further comprises the step of:
representing each of the shapes in the design with one or more trapezoids, wherein a six-tuple of non-vertical lines are used to define the x-coordinate of the left base, the x-coordinate of the right base and the sides of each trapezoid, and wherein each vertical line passes through at least two of the integer points; and
using 24 integer coordinates to represent each of the trapezoids.

7. The method of claim 1, wherein the design belongs to a universal bounding box [−CoordMax, CoordMax]×[−CoordMax, CoordMax] having a plurality of integer points, and wherein the using step further comprises the step of:
using the x-coordinates of the bases and the intersection points of the non-vertical lines to divide one or more of the trapezoids into the plurality of disjoint trapezoids, wherein each disjoint trapezoid is defined by a combination of the same non-vertical lines that are used to define one or more of the trapezoids, and wherein at least one of the disjoint trapezoids comprises non-integer point vertices.

8. The method of claim 1, wherein the design belongs to a universal bounding box [−CoordMax, CoordMax]×[−CoordMax, CoordMax] having a plurality of integer points, and wherein the method further comprises the step of:
partitioning the universal bounding box into a plurality of sequentially numbered columns, wherein any given one of the disjoint trapezoids is contained in exactly one of the columns.

9. The method of claim 8, further comprising the step of:
assigning tags to one or more of the columns, wherein each tag indicates to which of the one or more trapezoids each disjoint trapezoid in that column belongs.

10. The method of claim 8, further comprising the step of:
assigning an order to each of the non-vertical lines within a given one of the columns.

11. The method of claim 1, wherein each of the shapes in the design has a plurality of vertices, and wherein the representing step further comprises the steps of:
ordering to the vertices from left to right and top to bottom; and
making vertical cuts through the vertices in the assigned order.

12. The method of claim 11, further comprising the step of:
breaking down each of the shapes into a plurality of trapezoids having bases parallel to a y-axis.

13. An apparatus for generating a computer-based representation of a design having one or more shapes, the apparatus comprising:
a memory; and
at least one processor, coupled to the memory, operative to:
represent each of the shapes in the design with one or more trapezoids, wherein a fixed number of non-vertical lines are used to define an x-coordinate of a left base, an x-coordinate of a right base and sides of each trapezoid with intersection points being formed between the non-vertical lines that define the sides of the trapezoids;
use the x-coordinates of the bases and the intersection points of the non-vertical lines to divide one or more of the trapezoids into a plurality of disjoint trapezoids, wherein each disjoint trapezoid is defined by a combination of the same non-vertical lines that are used to define one or more of the trapezoids; and
assign order to the x-coordinates of the bases and the intersection points of the non-vertical lines, wherein the x-coordinates of the bases and the intersection points of the non-vertical lines in the assigned order are representative of the design.

14. The apparatus of claim 13, wherein the design belongs to a universal bounding box [−CoordMax, CoordMax]×[−CoordMax, CoordMax] having a plurality of integer points, and wherein the at least one processor is further operative to:
partition the universal bounding box into a plurality of sequentially numbered columns, wherein any given one of the disjoint trapezoids is contained in exactly one of the columns.

15. The apparatus of claim 14, wherein the at least one processor is further operative to:
assign tags to one or more of the columns, wherein each tag indicates to which of the one or more trapezoids each disjoint trapezoid in that column belongs.

16. The apparatus of claim 14, wherein the at least one processor is further operative to:
assign an order to each of the non-vertical lines within a given one of the columns.

17. An article of manufacture for generating a computer-based representation of a design having one or more shapes, comprising a non-transitory machine-readable medium containing one or more programs which when executed implement the steps of:
representing each of the shapes in the design with one or more trapezoids, wherein a fixed number of non-vertical lines are used to define an x-coordinate of a left base, an x-coordinate of a right base and sides of each trapezoid with intersection points being formed between the non-vertical lines that define the sides of the trapezoids;
using the x-coordinates of the bases and the intersection points of the non-vertical lines to divide one or more of the trapezoids into a plurality of disjoint trapezoids, wherein each disjoint trapezoid is defined by a combination of the same non-vertical lines that are used to define one or more of the trapezoids; and
assigning an order to the x-coordinates of the bases and the intersection points of the non-vertical lines, wherein the x-coordinates of the bases and the intersection points of the non-vertical lines in the assigned order are representative of the design.

18. The article of manufacture of claim 17, wherein the design belongs to a universal bounding box [−CoordMax, CoordMax]×[−CoordMax, CoordMax] having a plurality of integer points, and wherein the one or more programs which when executed further implement the step of:

partitioning the universal bounding box into a plurality of sequentially numbered columns, wherein any given one of the disjoint trapezoids is contained in exactly one of the columns.

19. The article of manufacture of claim 18, wherein the one or more programs which when executed further implement the step of:

assigning tags to one or more of the columns, wherein each tag indicates to which of the one or more trapezoids each disjoint trapezoid in that column belongs.

20. The article of manufacture of claim 18, wherein the one or more programs which when executed further implement the step of:

assigning an order to each of the non-vertical lines within a given one of the columns.

* * * * *